Patented Jan. 2, 1940

2,185,952

UNITED STATES PATENT OFFICE 2,185,952

METHOD OF MAKING UNSATURATED HYDROCARBONS

Fritz Rostler and Vilma Mehner, Vienna, Germany, assignors to Naftolen-Gesellschaft zur Verwertung der Rostler-Mehner'schen Verfahren m. b. H., Vienna, Germany, a corporation of Austria, now Germany No Drawing. Application July 21, 1938, Serial No. 220,584. In Austria May 4, 1932

14 Claims. (Cl. 196—148)

This invention or discovery relates to methods of making unsaturated hydrocarbons; and it comprises a method of producing new and useful oily or resinous hydrocarbons of unsaturated nature, capable of being vulcanized and otherwise used, wherein acid sludge produced in the sulfuric acid refining of petroleum oils is admixed with an excess of neutralizing agent and the admixture is heated to a relatively low temperature, generally below 400° C., at which it undergoes thermolytic conversion with a smooth and substantially complete splitting into organic and inorganic portions, the organic portion consisting principally of the new resinous oils which are then separated and recovered; separation being either by extraction advantageously with a volatile solvent, with subsequent distillation, or by distillation at relatively low temperatures and under conditions such that the partial pressure of the vapors at the point of formation is kept low, as in a high vacuum or stream of inert gas; the oily product in any case being distilled at a temperature such that cracking and decomposition are substantially avoided; and our invention further comprises, as new and useful materials, the oily, or resinous, hydrocarbon distillates obtained by thermolytic conversion of over-neutralized acid sludge, said distillates being high boiling viscous liquids or resinous solids at ordinary temperatures, having a reddish brown color with green fluorescence, being soluble in acetone, aniline and concentrated sulfuric acid, and being vulcanizable and readily prepared in a condition free of rubber poisons; all as more fully hereinafter set forth and as claimed.

The treatment of petroleum oils, including fractions thereof, with sulfuric acid, results in the formation of reaction products which remain associated with the unconsumed acid as a viscous liquid or semi-solid material. This material is known variously in this country as petroleum acid sludge, refinery acid sludge, sulfuric acid sludge, or acid sludge; and abroad, it is generally designated "acid tar". As stated, the present invention relates to the production of unsaturated hydrocarbon products of a particular type, soluble in concentrated sulfuric acid and having other distinguishing characteristics, from these acid tars or acid sludges. This application is a continuation-in-part of our co-pending applications, Serial No. 751,891, filed November 7, 1934, and Serial No. 138,666, filed April 23, 1937.

In refining mineral oils with sulfuric acid, the acid withdraws from the oil unsaturated organic compounds of various types, including resins and olefins, which are not desired in the purified oils. The petroleum oil is stirred with the acid as long as may be desired, and the acid sludge is then settled out and withdrawn. This sludge is a dark-colored, evil-smelling, tarry product, and is generally highly viscous, especially when heavy oils are refined.

Various processes are known to the prior art for the recovery of sulfuric acid from this acid sludge; the sulfuric acid being recovered as such, or in the form of sulfur dioxide, etc. Processes are also known for the recovery of the neutral oil or saturated hydrocarbons which are retained in the tar, this being generally effected by diluting the sludge to form "sludge acid" and to cause separation of the neutral oils. Processes have also been disclosed heretofore for recovery of the organic matter contained in the acid tar in the form of asphalts and the like. In these known prior processes, it was often considered preferable to treat mixtures of acid tars, or acid tars and sludges in admixture with other by-products.

It is our discovery that acid sludges, upon suitable treatment, yield as a product a new type of oily unsaturated hydrocarbons having distinctive properties. These new products may be obtained from substantially any of the acid tars or sludges obtained by refining mineral oils and their fractions with sulfuric acid; and it is immaterial whether the sludge is produced in refining paraffinic or naphthenic mineral oil products. Regardless of the source, we always obtain unsaturated hydrocarbons which are soluble in concentrated sulfuric acid and have high molecular weight and high viscosity. In some respects, these new products resemble oily resins or resinous oils.

While acid sludges are obtained in the refining of both cracked and uncracked petroleum products, it is known that these sludges and their constituents differ somewhat in composition and properties. In our invention, the acid sludges produced in refining natural oils, or fractions obtained in the low pressure distillation thereof, are most desirable. In other words, our invention is best applied to the acid sludges obtained in refining uncracked petroleum oils and products. The sludges formed in refining cracked petroleum products, and especially cracked gasolines and other light products, are not well suited for treatment in accordance with our invention, and yield different and less desirable products when so treated.

Our new hydrocarbon products are best obtained when utilizing acid tars or sludges which have been previously freed from neutral oil, as by centrifuging, etc. When neutral oils are present in the sludge, they go forward with the distillate produced in accordance with our invention, and the distillate is admixed or diluted with neutral or saturated hydrocarbons to that extent. We find it more advantageous to use as a raw material an acid sludge which has been previously freed from neutral oil.

We have found that the tarry constituents of the sludge consist mainly of addition products of sulfuric acid and the unsaturated organic compounds present, and we have also found that oily hydrocarbons which are soluble in sulfuric acid, and which have the other distinctive properties mentioned herein, may be recovered from these tarry constituents of the sludge by gentle treatment. It is a necessary part of the treatment to split off the combined sulfuric acid, and to eliminate it from the product along with substances having an undesired polymerizing effect, such as free acid or metallic halides such as aluminum chloride. It is our discovery that this may be accomplished by adding to the sludge more than enough neutralizing material to combine all the acid present in free form, and also that in combination with organic compounds, and then gently heating the mixture to cause thermolytic conversion into an organic portion constituting our new hydrocarbon product and an inorganic portion containing all the acidic, basic, and other inorganic constituents of the mixture. The hydrocarbon or oily portion may be separated from the mixture as fast as it is formed, as by distillation under suitable conditions described hereinbelow; or it may be separated after conversion is complete, as by extraction and fractionation of the extract. In all cases, the sulfuric acid and other inorganic constituents of the acid sludge are separated from the hydrocarbon product and left in the residue of distillation or extraction, along with the excess neutralizing agent; and this residue obtained in our process contains such a small proportion of organic material that it is not suitable for use as fuel. The organic constituents of the acid tar are, however, substantially completely converted into the new unsaturated hydrocarbon product. In other words, our process converts the acid sludge into an unsaturated hydrocarbon distillate and a non-volatile, inorganic residue.

It is thus an object achieved by our invention to provide a method for producing useful, new, unsaturated hydrocarbon products from the acid sludges produced in refining mineral oils. Another object achieved by our invention is to provide these new unsaturated hydrocarbon products, which have many applications in the arts.

In the operation of our process, we mix with the acid sludge a quantity of neutralizing agent which is sufficient to bind not only any free acid present, but also any acid which may be released by its organic associates during the thermal treatment. There is thus no undesired polymerizing action during distillation, or during any other step of the process; or, if polymerization occurs, it does not result in undesirable saturated compounds. As a rule, we determine analytically the total sulfur content of the acid sludge to be treated, and we then employ more neutralizing agent than corresponds to the total sulfur calculated as $SO_3$. This excess of neutralizing agent serves under all conditions to bind any acid which might otherwise be released during any stage of the formation and recovery of the new products, and thus prevents polymerization to saturated compounds and other undesired actions. It is essential to have an excess of neutralizing agent present and available during any heating of the unseparated reaction mixture.

We may use as neutralizing agents metal oxides or hydroxides or suitable salts such as carbonates, and we may also use metals which are readily attacked by the acid which is present or liberated in the mixture. When using metals, gases are developed which have the advantageous effect of loosening up the mixture, while the metal present improves heat transfer. Metallic wastes, such as turnings or metal chips, are suitable neutralizing agents. The loosening effect is, of course, also obtained when using as neutralizing agents carbonates, etc., which also evolve gases. Whatever neutralizing agent may be employed, it is essential that it be employed in excess.

We have found that certain compounds catalyze the reaction between the acid sludge and the neutralizing agent and shorten the time required for its completion. These catalytic agents also improve the yield and the quality of the organic reaction product (the new hydrocarbons) obtained. Catalysts which we have found to have this effect are heavy metal salts such as copper sulfate and iron sulfate. These catalysts may be added to the neutralizing agent or to the mixture of neutralizing agent and acid sludge. When using slaked lime as the neutralizing agent, the catalyst may conveniently be incorporated therein by slaking with a copper sulfate solution. Some commercial products contain sufficient iron or copper compounds as impurities to make the use of additional catalysts unnecessary. This is often true of dolomite, for example, which is a suitable neutralizing agent for our process.

The reaction mixture obtained by combining the acid sludge and excess neutralizing agent is substantially solid at ordinary temperatures and may be comminuted, if desired, prior to distillation. Dry distillation is then effected, generally in a vacuum, as this makes possible the use of lower temperatures. In any case, it is best to so operate that the highest temperature, even at the end of the distillation, does not exceed 380° C. It may sometimes be permissible to end at a temperature as high as 410° C., but it is better to remain below 400° C., and we regard it as best to maintain the hydrocarbons at temperatures below 360° C. at all stages of the treatment. In practice, it is often permissible to operate at even lower temperatures, as shown by the examples hereinbelow. The use of temperatures below about 400° C. prevents cracking and decomposition or other undesired effects on the unsaturated hydrocarbons which are desired in the product.

One method of separating the desired hydrocarbon products from the reaction mixture by distillation at these low temperatures, is to operate under a rather high vacuum. When so operating, the pressure during distillation should not exceed 100 mm. mercury, and, in practice, is often as low as 12 to 40 mm. or less. This effects a low partial pressure of the oil (hydrocarbon) vapors at the point of evolution. When relying on vacuum to effect this low partial pressure, it is necessary to employ greatly reduced pressure in the still, and it is difficult or impossible to obtain our unsaturated hydrocarbons if the pressure during distillation exceeds 100 mm. mercury. At higher pressures, in this method of operating, the unsaturated hydrocarbons constituting our new product are not separated as such from the mixture, or are partially consumed (oxidized) by the sulfuric acid constituents present, or are otherwise changed into undesirable products, in whole or in part.

It is often advantageous, when operating under high vacuum, to apply the vacuum for a time at a certain temperature—say 200° C.—and then to shut off the vacuum while rapidly raising the temperature to 250° C., for example. This stepwise operation may be repeated as often as desired, and effects considerable saving of time as compared with operating entirely under vacuum.

The vacuum distillation may be effected while passing through the still a current of an inert gas, such as superheated steam. A slight flow of inert gas during the dry vacuum distillation shortens the time required for complete recovery of the hydrocarbon distillate, and has the further advantage that it permits treatment under even more gentle conditions than the vacuum alone.

In another embodiment of our invention, the essential low partial pressure of the oil vapors at the point of evolution is insured by the circulation of a substantial current of inert gas through the still. This is effective in obtaining the desired products when no vacuum is applied, or when there is a slight vacuum not sufficient in itself to enable operation at the desired low temperatures. For example, the dry reaction mixture may be fed through a tubular chamber equipped with a helical conveyor. The chamber and the reaction product therein are heated to a temperature of the order of, but not exceeding, 400° C., and a current of nitrogen or other inert gas is passed through the chamber, advantageously countercurrent to the movement of the reaction material. This produces in the chamber an atmosphere consisting predominantly of the inert gas, and reduces the partial pressure of the evolved hydrocarbon vapors. The vapors are carried out of the chamber with the gaseous current and readily condensed therefrom by cooling in known manner. Advantageously, the gas partially or completely stripped of oil vapors is then reheated, as by a heat exchanger and auxiliary heater, and returned to the chamber. Recirculation is desirable as it minimizes loss of heat, as well as loss of the product, from the system.

This embodiment of our invention may also be operated on a batch basis, although it is advantageous to operate it on a continuous basis with recirculation of the gas and heat exchange between gas withdrawn from the stripping chamber and gas returned thereto. In this method of operation, as well as when operating at a high vacuum, the new hydrocarbon product may be obtained at sufficiently low temperatures to insure the desired characteristics.

The embodiments of our process described hereinabove include treatment of acid sludge from the sulfuric acid refining of mineral oil with an excess of neutralizing agent, with or without the presence of neutral oil, followed by dry distillation of the organic reaction product at relatively low temperatures and conditions of low partial pressure. In a modification of these methods, the mixture of acid sludge and the excess of neutralizing agent is treated with a suitable organic solvent for the hydrocarbon compounds, advantageously after heating sufficiently to effect thermolytic conversion into the desired hydrocarbon product and the substantially inorganic residue. Suitable solvents include ether, acetone and other ketones, liquid hydrocarbons and chlorinated hydrocarbons. These solvents extract the desired oily or resinous unsaturated hydrocarbons from the reaction mixture, and the extract thus obtained is subjected to distillation. Advantageously, this distillation of the extract is effected under reduced pressure, with a fractionation of the distillate to recover the solvent for re-use. This vacuum distillation of the extracts may be accompanied by a feed of an inert gas, as previously described, and neutralizing agents should be present throughout the distillation. Extraction effects a pre-purification of the product, and the hydrocarbons recovered by this treatment are more pure than those obtained without extraction. Extraction also facilitates distillation of the product. When an end product of extremely high purity is required, the product of the original distillation of either the extract or the reaction mixtures may be redistilled.

In a modification of the extraction process, the extract obtained is merely heated to distill off the volatile solvent. The residue consists of our new hydrocarbons in sufficient purity for some applications.

The hydrocarbon product obtained according to our invention consists of unsaturated compounds having a composition, determined by analysis, of approximately 90 per cent carbon and 10 per cent hydrogen. This corresponds to the general formula $(C_3H_4)_n$. The molecular weight of these products varies from about 400 to 1000, and usually averages approximately 600. They have a reddish brown color and a green opalescence or fluorescence, and may be oils of high viscosity or resin-like substances at ordinary temperatures. Their specific gravities are high, being, as a rule, greater than one. Their boiling points are much higher than those of the petroleum distillates from which the acid sludge was obtained; as a rule, they distill over at temperatures between 160 and 380° C. at a pressure of 12 mm. mercury. Their viscosities at ordinary temperatures are often 100 to 200 times as high as those of the refined mineral oil products from which they are obtained. Their iodine numbers are low, often below 20.

These new hydrocarbon products are still further distinguished from other hydrocarbons of mineral origin by their reactions with various reagents. They react but slightly, if at all, with dilute aqueous reagents, but they are extremely reactive with several concentrated reagents. They can be nitrated smoothly, forming derivatives on treatment with strong nitric acid; and on treatment with strong sulfuric acid they are converted into addition products with considerable evolution of heat. In contrast with ordinary petroleum hydrocarbons, they are completely soluble in acetone and aniline, as well as concentrated sulfuric acid. Hydrogenation under conditions usually suitable for mineral oils is so difficult as to be impractical. They have a great affinity for sulfur, however, and, when heated with small quantities of sulfur, they form more highly viscous derivatives or polymerization products. It thus appears that they are closely allied to rubber, $(C_5H_8)_x$; and, like rubber, they are "vulcanizable".

We have thus obtained a new and definite type of unsaturated hydrocarbons, having distinctive reactivities, from the acid sludges produced in refining mineral oil products with sulfuric acid. Our new hydrocarbon product is entirely distinct from products obtained in prior processes of treating acid sludge or acid tar. These prior products were either mixtures of previously known hydrocarbons, such as benzines and lubricating oils, or products such as asphalts, having no definite composition. Furthermore, while the prior products varied greatly in accordance with the starting material, the characteristics of our new product are substantially independent of the starting material.

The peculiar properties of our new oils and their availability in large quantities make them useful in numerous branches of the chemical industry. For example, they may be used as slowly resinifying oils for impregnation; and they, or their nitric acid derivatives, may be used in the production of lacquers and varnishes. They also find many applications in the rubber industry, where they are useful as filling or spreading materials, in "devulcanization" and regeneration, and for other purposes described in detail in our co-pending applications, Serial No. 166,392, filed September 29, 1937, and Serial No. 263,810, filed March 23, 1939.

When the acid sludge used as a starting material in our process is obtained by refining solid paraffin with sulfuric acid, the product of our distillation generally contains saturated hydrocarbons (paraffins) which are insoluble in sulfuric acid, along with the desired unsaturated hydrocarbons which are soluble in sulfuric acid. Our unsaturated hydrocarbon product may then be separated from the paraffin by treatment with a suitable selective solvent, such as acetone or ether-alcohol, or otherwise.

Various embodiments of our invention are illustrated in the following examples:

*Example I.*—A mixture of 30 parts of acid sludge, obtained in refining lubricating oil with sulfuric acid, and of 20 parts pulverized chalk, was subjected to distillation in vacuo. There resulted a reddish brown fluorescent oil in a yield of 27 per cent on the acid sludge. Most of the distillate was obtained between 270° and 290° C. under a pressure of 12 mm. mercury. It was completely soluble in concentrated sulfuric acid.

*Example II.*—38 parts of acid tar obtained in refining a light lubricating oil were mixed with 40 parts chalk, and the mixture was distilled in vacuo. The distillation produced a highly viscous oil, most of which came over between 250° and 270° C. at a pressure of 12 mm. mercury. The yield was 34 per cent on the acid sludge, and the product was soluble in sulfuric acid.

*Example III.*—50 parts of acid sludge from paraffin refining were mixed with 30 parts chalk and distilled in vacuo. There was obtained a light yellow paraffin-like mass. This was extracted with acetone to recover hydrocarbons soluble in sulfuric acid, amounting to 5 per cent on the acid sludge. Paraffin was also recovered in a yield of 30 per cent on the sludge.

*Example IV.*—100 parts of centrifuged acid sludge obtained in the refining of automobile oil were mixed with 60 parts magnesite. The mixture was pulverized and distilled in vacuo. The distillate boiled between 175° and 320° C. at a pressure of 40 mm. mercury. The yield of hydrocarbons soluble in sulfuric acid amounted to 40 per cent on the acid tar.

*Example V.*—100 parts of an acid resin obtained by refining petroleum with sulfuric acid and drawn from an acid tar pit where it had been stored for three years were mixed with 55 parts pulverized slaked lime. The mixture was distilled in vacuo in a current of superheated steam. Hydrocarbons soluble in sulfuric acid were obtained in a yield of 60 per cent on the acid tar.

*Example VI.*—40 parts of an acid tar obtained in refining lubricating oil were mixed with 20 parts aluminum chips and distilled in vacuo. The yield of oil soluble in sulfuric acid was 18 per cent on the acid tar.

*Example VII.*—20 parts acid tar from the refining of lubricating oil were mixed with 26 parts lime and distilled in vacuo with superheated steam. Oil soluble in sulfuric acid was obtained in a yield of 25 per cent on the acid tar.

*Example VIII.*—10 parts of acid sludge obtained in the refining of lubricating oil were mixed with 4 parts copper chips and distilled in vacuo. The yield of hydrocarbons soluble in sulfuric acid was 28 per cent on the acid sludge.

*Example IX.*—100 parts of acid sludge, obtained by refining lubricating oil in a process employing De Laval separators, were reacted with 60 parts iron chips and distilled in vacuo. The distillate was obtained at temperatures between 185° and 340° C. at a pressure of 60 mm. mercury. Hydrocarbons soluble in sulfuric acid were obtained in a yield of 40 per cent on the acid tar.

*Example X.*—100 parts acid sludge from refining paraffin were mixed with 70 parts chalk and 2 parts iron chips. The reaction product was extracted with ether and the extract was distilled in a vacuum of 12 to 40 mm. mercury over calcium oxide. The maximum temperature was 380° C. The yield was 30 parts paraffin and 5 parts of oil soluble in sulfuric acid.

*Example XI.*—100 parts of acid tar, obtained in refining lubricating oil, were mixed with 80 parts of slaked lime containing copper, added by the use of copper sulfate solution in slaking. The reaction mixture was subjected to dry distillation in vacuo, and resulted in 60 parts of very viscous oil and traces of paraffin.

*Example XII.*—100 parts of acid sludge from paraffin refining were heated with 60 parts of lime, and the product obtained was mixed with cuttings of brass wire gauze and distilled in vacuo. The yield was 35 parts paraffin and 10 parts of oil soluble in sulfuric acid.

*Example XIII.*—100 parts of acid sludge derived from paraffin refining were mixed with 2 parts of iron filings and 70 parts of lime. After heating, the reaction mixture was extracted with acetone oil. The yield obtained after removal of the acetone oil was 20 parts paraffin and 5 parts of oil soluble in sulfuric acid.

*Example XIV.*—100 parts of acid sludge derived from refining lubricating oil were mixed with 60 parts lime. The dry mixture was charged into an inclined tubular chamber provided with a helical conveyor through which a countercurrent of nitrogen was recirculated. The chamber was maintained at a temperature of 350° to 390° C. Gas and vapors discharged from the chamber were cooled to a temperature of 120° C., condensing the hydrocarbon product from the gas stream before returning the nitrogen to the chamber. The yield was 42 per cent, calculated on the acid sludge, of oil soluble in sulfuric acid.

The parts mentioned in the above examples are parts by weight. These examples are given by way of illustration only, and not by way of limitation, and various modifications may be made in the details disclosed therein without departing from the spirit of our invention.

While, as stated hereinabove, any acid sludges from the refining of petroleum oils may be used, the most useful products for most applications now known are obtained only from the sludges derived from petroleum oils heavier than kerosene. Of these, we generally find acid sludges from lubricating oil refining the most suitable.

In the embodiment of our process wherein a current of gas is employed to maintain low partial pressure of the hydrocarbon vapors, the gas current also removes the vapors substantially as fast as they are produced. Other inert gases besides nitrogen may be used for this purpose. Air has an oxidizing effect which is undesirable, but products of combustion are substantially free from this objection. Steam works well, but its use is expensive in heat units. It is not necessary, however, to completely condense the oils from the gas stream when the gas is recirculated, as the uncondensed hydrocarbons are not lost from the system.

The product resulting from the process of this application is further described and claimed in our copending divisional application, Serial No. 275,726, filed May 25, 1939.

What we claim is:

1. The method of producing new and valuable unsaturated hydrocarbons, which comprises mixing acid sludge from the sulfuric acid refining of petroleum oils with an inorganic alkaline reagent selected from the group consisting of oxides, hydroxides and carbonates of alkali and alkali earth metals, said reagent being employed in a quantity in excess of that required to combine with all of the sulfur present in the sludge, calculated as $SO_3$, heating the mixture to effect thermolytic conversion into a substantially inorganic non-volatile fraction and an unsaturated hydrocarbon fraction, recovering said hydrocarbon fraction from the reaction mixture by a procedure including distillation under conditions of low partial pressure, and keeping the temperature of the said hydrocarbon fraction in the range below about 360° C. throughout the process.

2. The method of claim 1, wherein recovery of said hydrocarbon fraction is effected by distillation substantially as fast as formed, while maintaining such low partial pressure of the hydrocarbon at the point of formation that its boiling range is below 360° C.

3. The method of claim 1, wherein recovery of said hydrocarbon fraction is effected by distillation substantially as fast as formed, while maintaining low partial pressure of the hydrocarbon at the point of formation by application of a vacuum to the distilling chamber.

4. The method of claim 1, wherein recovery of said hydrocarbon fraction is effected by distillation substantially as fast as formed, while maintaining low partial pressure of the hydrocarbon at the point of formation by circulating inert gas through the distilling chamber.

5. The method of claim 1, wherein recovery of said hydrocarbon fraction is effected by distillation at a rate substantially as fast as it is formed while maintaining low partial pressure of the hydrocarbon at the point of formation by application of a vacuum to the distilling chamber while passing a small amount of inert gas therethrough.

6. The method of claim 1, wherein recovery of said hydrocarbon fraction is effected by extraction of the reaction mixture with a volatile organic solvent to form an extract, which is then distilled to separate the hydrocarbon, and wherein the hydrocarbon is distilled under vacuum.

7. The method of claim 1, wherein the neutralizing agent comprises lime.

8. The method of claim 1, wherein the neutralizing agent is dolomite.

9. Process for the production of viscous hydrocarbon products which consists in mixing acid tar prepared from mineral oils by sulfuric acid refining with dolomite in sufficient quantity to split off and neutralize the chemically combined acid and prevent polymerization of the resulting unsaturated hydrocarbon and to leave an excess of the neutralizing agent, followed by vacuum distillation of the mixture in the presence of the excess neutralizing agent and collection of the hydrocarbon distillate.

10. Proces for the production of viscous hydrocarbon products which consists in mixing acid tar prepared from mineral oils by sulfuric acid refining with dolomite in sufficient quantity to split off and neutralize the chemically combined acid and prevent polymerization of resulting unsaturated hydrocarbon and to leave an excess of the neutralizing agent, followed by the addition of a catalyst selected from the group consisting of iron, copper and brass and vacuum distillation of the mixture in the presence of the excess neutralizing agent and collection of the hydrocarbon distillate.

11. In the manufacture of new and useful unsaturated oils of high molecular weight, low iodine number and high boiling point from waste petroleum acid sludge, the process which comprises mixing such sludge with an inorganic alkaline reagent selected from the group consisting of oxides, hydroxides and carbonates of alkali and alkali earth metals, said reagent being employed in a sufficient amount to form a dry basic mass, heating the mass to a temperature under the cracking temperature of the oils to be produced, thereby producing internal molecular reactions of the nature of thermolysis with scission of the organic and inorganic constituents, the organic constituents being said new and valuable oils, and recovering the new oils from the thermolyzed reaction mixture, the temperatures of the said new oils being maintained in the range below about 360° C. throughout the process.

12. The method of claim 11, wherein the acid sludge is freed from entrained neutral oils before mixture with the alkaline reagent.

13. The method of claim 11, wherein the said acid sludge is obtained in the refining of petroleum oils heavier than kerosene.

14. The method of claim 11, wherein heating of the mixture of acid sludge and neutralizing agent is effected in the presence of a catalyst.

FRITZ ROSTLER.
VILMA MEHNER.